UNITED STATES PATENT OFFICE.

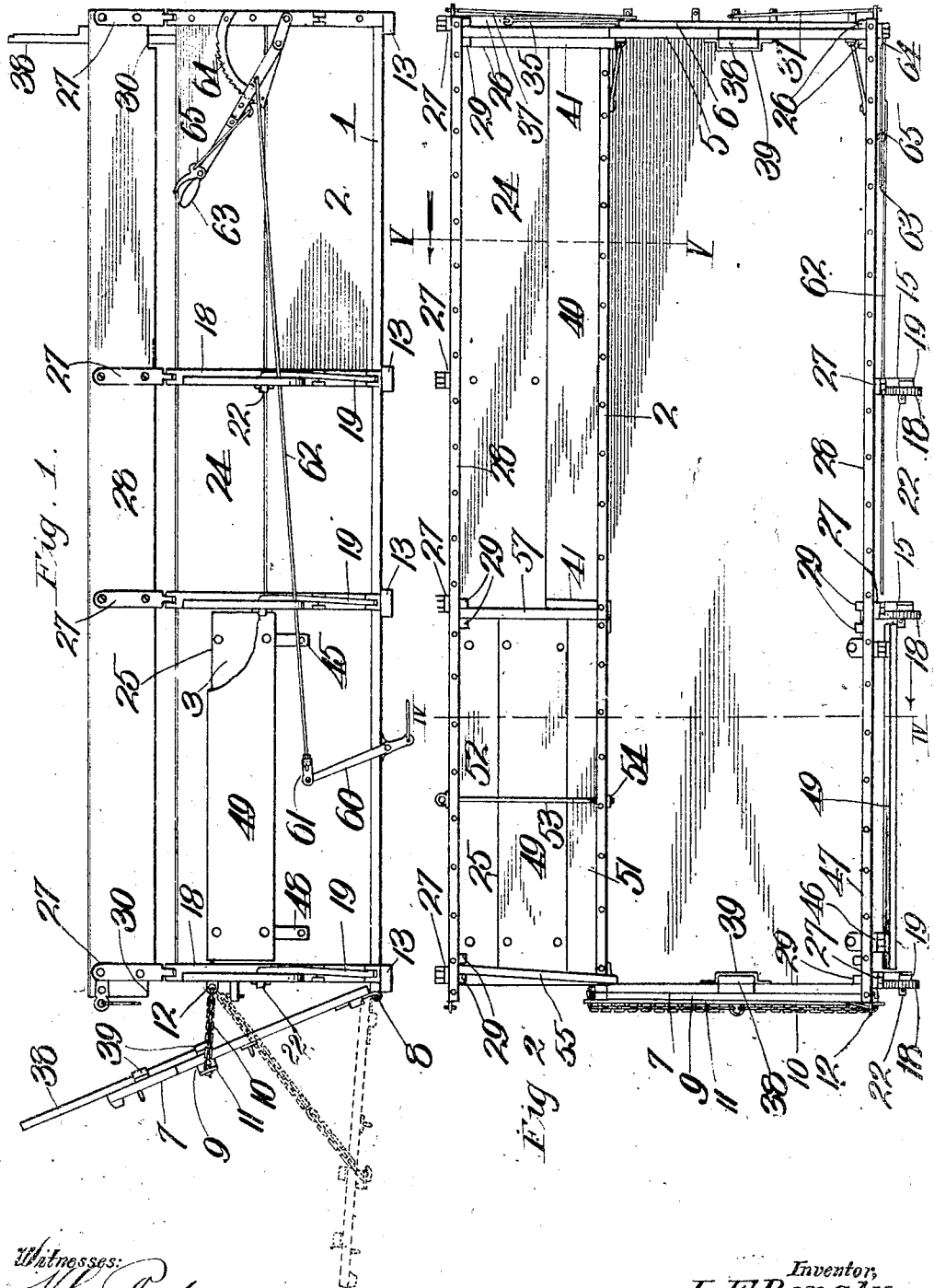

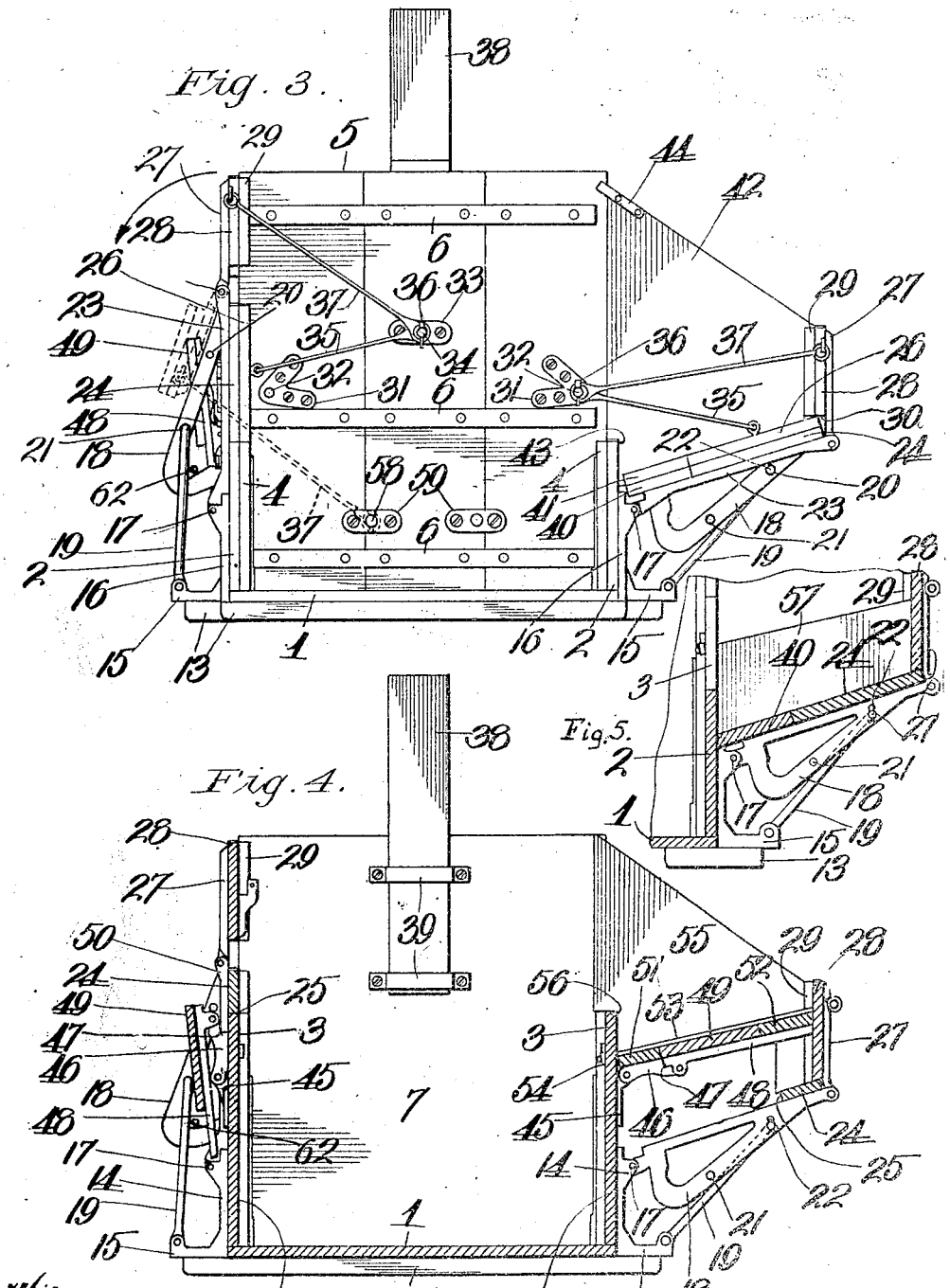

LOUIS F. BONALY, OF KICKAPOO TOWNSHIP, LEAVENWORTH COUNTY, KANSAS.

CONVERTIBLE WAGON-BOX.

1,062,761.  Specification of Letters Patent.  Patented May 27, 1913.

Application filed December 11, 1911. Serial No. 665,558.

*To all whom it may concern:*

Be it known that I, LOUIS F. BONALY, a citizen of the United States, residing in Kickapoo township, in the county of Leavenworth and State of Kansas, have invented certain new and useful Improvements in Convertible Wagon-Boxes, of which the following is a specification.

This invention relates to wagon boxes of that type which can be used for transporting grain, as a hog or hay rack and as a header hopper, and my particular object is to produce a construction which, when arranged as a header hopper, includes a lateral extension for one or each side of the box, the extension being shallower at its rear end than at its front end to accommodate the increase in height of the rear wheels over the front ones without increase of height of the side of the extension as an increase in the height of the side of the extension increases the labor of loading the wagon from the ground.

With this object in view, the invention consists in certain novel and peculiar features of construction and organization as hereinafter described and claimed; and in order that it may be fully understood reference is to be had to the accompanying drawings, in which—

Figure 1, is a side view of a convertible wagon box embodying my invention. Fig. 2 is a top plan view of the same when arranged as a header hopper. Fig. 3, is an enlarged front view of the box when arranged as a header hopper. Fig. 4, is a section on the line IV—IV of Fig. 2, on the same scale as Fig. 3. Fig. 5, is a section on the line V—V of Fig. 2.

In the said drawings, 1 indicates the bed or bottom of the wagon box and 2 the side boards thereof, said boards from their rear ends to a point forward of the rear wheels (not shown), being extended upward at 3, to increase their height for a purpose which hereinafter appears.

4 are vertical cleats at the inner sides of said boards, spaced apart to provide grooves for the reception of the front wall 5 of the box, said wall consisting preferably of a plurality of upright boards secured together by horizontal cleats 6, as shown most clearly in Fig. 3.

The rear wall 7 of the box is hinged at 8 to the bed and is provided with a cross cleat 9 and chains 10, having a sliding relation to a plate 11, secured to the cross cleat, the ends of the chains being attached to ears 12, secured to the rear ends of the sides of the body. By means of these chains the rear wall 7 may be secured in an upright position for closing the rear end of the wagon box or in a horizontal position. In the latter position the said wall may constitute a shoveling board. Of course the said wall may be secured at any desired point intermediate of said closed and opened positions. The particular means for securing this rear wall is, however, unimportant, and has therefore not been described or shown in detail.

13 are cross cleats underlying the body at its ends and intermediate points, all of said cross cleats except the front one projecting substantially beyond the sides of the body, and secured upon the said projecting ends are right angle brackets, consisting of vertical arms 14 fitting against the boards 2, and horizontal arms 15 fitting upon the said cleats.

16 are bars or brackets corresponding in all material respects to the vertical arms of said brackets, secured upon the ends of the front cross cleat 13 and to the side boards 2, it being undesirable for a reason hereinafter mentioned, to provide the front bars or brackets 16 with outwardly projecting arms 15.

Hinged at 17 to the arms 14 of the right angle brackets are triangle-shaped brackets 18, and the hypotenuse sides of all of said brackets 18 are pivotally connected by braces 19 with the outer ends of arms 15, it being noted that said hypotenuse sides of said brackets 18 are each provided with two pivot holes 20 and 21, the upper one, 20, to receive the pivot pin 22 for pivotally connecting the braces with said brackets when the latter occupy the upwardly and outwardly sloping positions shown most clearly in Figs. 3 to 5 inclusive, the lower one, 21, being adapted to receive said pin when the brackets are upright, as shown most clearly at the left-hand side of Figs. 3 and 4.

23 are brackets or bars corresponding in all respects to the inner portions or sides of the right-angle triangle shaped brackets, the lower ends of the bars or brackets 23 being connected pivotally at 17 to the upper ends of the bars or brackets 16, and in this connection it is desirable to state that the last-named bars or brackets and the bars or brackets 23 are in the form of straight brackets in order to avoid projecting portions which would interfere with the front wheels, (not shown), in turning, when the various pivoted brackets mentioned are swung down to the position shown in Fig. 5, and at the right hand side of Figs. 3 and 4, and the upper side of Fig. 2, in which position said parts are reliably held by the braces 19.

The brackets 23 and the parallel sides or portions of brackets 18 carry boards 24, which fit upon boards 2 when the said brackets are upright as shown in Fig. 1, and at the left hand side of Figs. 3 and 4, and said boards 24 are cut away to provide recesses 25 for snugly receiving the extensions 3 of the boards 2. The boards 24, like boards 2, are provided at their front ends and inner sides with inwardly projecting spaced cleats 26 to provide grooves receiving the front end wall 5 when the said boards are upright, and for receiving the front end board hereinafter identified, when the wagon body is arranged for use as a header hopper.

27 are straps pivoted to the upper ends of the brackets 18, and 23, and carried by and at the inner sides of said straps are boards 28, provided at their inner sides with parallel spaced cleats 29, and said boards are adapted to occupy positions vertically above and spaced from boards 24 when the latter are upright and to stand in an upright position upon the outer edges of boards 24 when the latter occupy the position shown at the right hand sides of Figs. 3 and 4, the lower corners of boards 28, being notched at 30 to accommodate the cleats 26 on boards 24 as shown most clearly in Figs. 1 and 3.

Secured to the wall 5 at the front side thereof is a pair of brackets 31 provided with outwardly projecting pins 32, and also secured to said wall 5 is a bracket 33 provided with an outwardly projecting pin 34.

35 is a link pivotally connected to one of the cleats 26 of each board 24, and each of said links is adapted to fit at its opposite end over the pin 32 of one of the brackets 31, and thus tend to prevent the accidental upward movement of the brackets 18 and 23, and also coöperate with braces 19 in preventing undue downward movement of said brackets. It is mainly to strengthen the front end as the braces 19, are lacking at such point. The inner ends of said links are also adapted to fit over the pin 34 of bracket 33 when the said brackets are upright, as shown most clearly at the left hand side of Figs. 3 and 4, and in each case a removable pin or cotter 36 is engaged with the end of pin 32 or 34 to prevent accidental disengagement of the link or links with either of said pin or pins.

37 are links pivoted at their outer ends to boards 28 and adapted when said boards occupy the relative positions shown at the right hand side of Figs. 3 and 4, to engage the adjacent pins 32 and be secured thereon by the cotters 36. When the boards 28 are arranged as shown at the left hand side of Figs. 3 and 4, the links 37 extend downwardly and inwardly and are engaged with the pin 34 of bracket 35 and are retained thereon by a cotter 36 as shown in Fig. 3.

When the wagon box is closed at both sides as indicated at the left hand side of Figs. 3 and 4, it is adapted for the conveyance of livestock. It is also arranged in the same position when it is used as a hay rack, but in the latter case each end wall is preferably provided with an upwardly extending standard 38 held in clamping clips 39 as shown or in any other suitable manner.

For use as a header hopper, it is ordinarily necessary to only lower one side as shown in the drawings but of course both sides may be lowered if desired. When it is so used an opening is left between the normally lower edge of board 24 and the adjacent side board 2, the opening being wider at the point where board 24 is recessed at 25 than forward of such recess as will be seen most clearly by reference to Figs. 2, 4, and 5, in order that said board may swing over the adjacent rear wheel, and occupy a lower plane than the top of said wheel for the purpose of increasing the capacity of the wagon. To fill said opening from the front end of the wagon box to about the front end of said recess, a board 40 is placed flatwise upon the brackets 18 and 23, as shown in Figs. 3 and 5, and said board is provided at its front end with spaced cleats 41 which stand in alinement with and form continuations of cleats 26, and to form a closure for the front end of the space between the front wall 5, board 28 and board 24 and 40, a substantially triangular end wall 42 is provided, the same fitting at its lower end between spaced cleats 26 and the spaced cleats 41, and at its outer edges between spaced cleats 29 of boards 28. At its inner edge the wall 42 bears against the corresponding edge of wall 5 and is recessed at 43 so as to fit against the outer side and upper edge of boards 2. At its upper corner, wall 42 is provided with a strap 44 for engagement with the wall 5 to secure the parts at said points in fixed relation.

The rear portions of the lateral extensions or hoppers of the wagon box outward of the plane of boards 4, must be made shallow in order to avoid conflict with the rear wheels which project to a higher plane than boards 24 when in the position shown at the right hand side of Figs. 3 and 4, and to accomplish this purpose, I provide the following construction: 45 are straps secured to boards 2 and hinged thereto are straps 46, recessed at their upper and inner corhers at 47 and pivoted to straps 46 are straps 48 adapted with straps 46, to extend from boards 2 to boards 28 and occupy a position substantialy parallel with the adjacent sides of the triangular brackets 18, as shown clearly in Fig. 4, and secured permanently to the inner or upper sides of straps 48 and of width to extend from the inner ends of the same to within a suitable distance of the outer ends thereof are boards 49.

When the wagon box is adapted for the transportation of grain or live stock, the straps 46 stand upright and the board-carrying straps 48 hang pendently therefrom as shown at the left hand side of Figs. 3 and 4, and at such time the straps 50 directly connecting straps 27 with the recessed ends of boards 24, fit at their lower ends in the recesses 47 of straps 46 and overlap the outer sides of boards 2, for the purpose of guarding against any possibility of buckling movement at the pivotal point of connection between the brackets 18, 23 and 27.

When the straps 46 and 48 occupy the position shown at the right hand side of Figs. 3 and 4, the lower ends of straps 48 engage the notches 47 of straps 46, and guard against independent downward movement of the former, and to complete the flooring of the shallow portions of the hopper, removable boards 51 and 52 are placed respectively on straps 46 and 48 and between boards 2 and 49 and 28 and 49, as shown clearly in Fig. 4, and to hold said removable boards reliably in position, a bolt 53 extends transversely across boards 49, 51, 52, and through boards 2 and 28, with its head bearing firmly against the outer side of the last-named board and a nut 54 engaging its inner end at the inner side of board 2.

The rear ends of the shallow portions of the hopper are closed by removable triangular boards 55 which rest upon boards 49, 51 and 52 and are recessed at their inner lower corners at 56 to overhang and rest upon the extensions of boards 2. The walls 55 overlap the rear end wall 7 at its inner side and fit at their outer edges in the grooves formed by the cleats 29 of boards 28, and in order to close the space between the front and rear ends of the shallow and deep portions of the hoppers vertical partitions 57 are arranged upon boards 24 and 40 and against the front ends of boards 49, 51 and 52 and are held in position by fitting in the grooves formed between the intermediate set of cleats 29 of boards 28.

When the wagon box is used for ordinary hauling where material depth is unnecessary or undesirable, the links 37 are detached from pin 34 and boards 28 are swung from the position shown in full lines at the left hand sides of Figs. 3 and 4 to the position shown in dotted lines Fig. 3, and in such new position said boards are secured by fitting the inner ends of links 37 over pins 58 projecting from brackets 59, secured to the front wall 5, cotters 36 being also employed to prevent accidental disengagement of the links 37 with said pins 58.

For applying brakes (not shown), to the rear wheels, a brake lever 60 is pivoted to the wagon box as shown in Fig. 1, and is adapted to be connected at its lower end to an ordinary brake beam, not shown, and at its upper end is provided with a U-shaped clip 61 within which is swiveled the rear end of a brake rod 62 which extends loosely through the skeleton triangular brackets 18, and is attached at its front end in the customary manner to a hand lever 63, pivoted to a sector 64, and provided with the customary catch mechanism 65, for engagement with the sector. By thus swiveling the rear end of the brake rod to the clip 61 it is possible for the side boards 24 to be lowered to convert the box into a header hopper without interference with or imposing any strain upon the brake mechanism as will be readily understood.

From the above description it will be apparent that I have produced a convertible wagon box embodying the features of advantage enumerated as desirable and which obviously is susceptible of modification without departing from the spirit and scope of the appended claims.

I claim:

1. The combination with a wagon box of a lateral extension or hopper therefor, comprising longitudinally alined and communicating front and rear portions, the former being the deeper and closed at its rear end below the front end of the rear or shallow portion, closures for the front and rear ends respectively of said front and rear portions, and means for holding the extension or hopper in fixed relation to the wagon box.

2. The combination with a wagon box of lateral extensions or hoppers therefor, consisting of upwardly and outwardly sloping bottoms, vertical sides at the outer edges of the bottoms and ends or closures interposed between the said sides and the wagon box near the front and rear ends of the latter; the said hoppers or extensions each consisting of a front portion and a communicating rear portion of less depth than the front portion, and a closure for the rear end of the front portion below the plane of the rear portion.

3. A convertible wagon box, comprising a bottom, ends and permanent sides, boards recessed in their lower or inner edges from their rear ends forwardly a suitable distance, and hingedly supported and adapted to stand edgewise above the said sides to increase the depth of the same or to occupy an upwardly and outwardly sloping position outward of the permanent sides, upward extensions 3 for the permanent sides, occupying said recesses of the hingedly supported boards when the latter stand edgewise above the permanent sides, and hinged boards pendent outward of the permanent sides when the recessed boards are standing above the sides, and overlying the recesses of said recessed boards when the same are in said sloping position.

In testimony whereof I affix my signature, in the presence of two witnesses.

LOUIS F. BONALY.

Witnesses:
JOHN EHART,
G. Y. THORPE.